United States Patent [19]

Lewis et al.

[11] Patent Number: 5,590,331
[45] Date of Patent: Dec. 31, 1996

[54] METHOD AND APPARATUS FOR GENERATING PLATFORM-STANDARD OBJECT FILES CONTAINING MACHINE-INDEPENDENT CODE

[75] Inventors: Brian T. Lewis; Theodore C. Goldstein, both of Palo Alto, Calif.

[73] Assignee: Sun Microsystems, Inc., Mountain View, Calif.

[21] Appl. No.: 363,743

[22] Filed: Dec. 23, 1994

[51] Int. Cl.$^6$ ...................................................... G06F 9/45
[52] U.S. Cl. ............................................................. 395/708
[58] Field of Search ............................................. 395/700

[56] References Cited

U.S. PATENT DOCUMENTS

| | | | |
|---|---|---|---|
| 4,672,532 | 6/1987 | JongeVos | 364/200 |
| 5,204,960 | 4/1993 | Smith et al. | 395/700 |
| 5,280,617 | 1/1994 | Brender et al. | 395/700 |
| 5,303,380 | 4/1994 | Tenny et al. | 395/700 |
| 5,339,419 | 8/1994 | Chan et al. | 395/700 |

OTHER PUBLICATIONS

G. Krasner, *The Smalltalk –80 Virtual Machine*, (Byte Publications, Inc., Aug. 1981), pp. 300–320.

A. Padawer, *Microsoft P–Code Technology*, (CD–ROM) Microsoft Developer Network Development Library No. 8, (Jul. 1994), pp. 1–7 and 1–10.

*System V, Application Binary Interface*, revised edition, UNIX System Laboratories, Inc. (1992) pp. 4–1 to 4–33 and 5–1 to 5–24.

U. Holzle and D. Ungar, *A Third–Generation SELF Implementation: Reconciling Responsiveness with Performance*, OOPSLA 1994 Conference Proceedings, Portland, (Oct. 1994), PP. 1–15.

M. Franz, Programming Languages and System Architecture, Springer Verlag #782, (Mar. 1994), ISBN 0–387–57840, pp. 1–26.

*Advertisement for Eiffel Bench*, by Interactive Software Engineering Inc.

*Primary Examiner*—Kevin A. Kriess
*Assistant Examiner*—Kakali Chaki
*Attorney, Agent, or Firm*—Blakely Sokoloff Taylor & Zafman LLP

[57] ABSTRACT

A method and apparatus for generating a platform-standard object file containing machine-independent abstract code. Source code which defines a procedure is convened into abstract code which makes no assumptions about the platform on which the procedure will be executed. An abstract code platform-standard object file is generated based on the abstract code. The abstract code platform-standard object file includes a list of definitions of any global variables defined in the abstract code, a list of symbol references indicative of any external variables or external procedures referenced in the abstract code, a sequence of machine instructions for calling an execution routine when a client calls the procedure, and the abstract code which defines the procedure. The abstract code is preferably compressed before it is stored in the abstract code platform-standard object file. When a program including the abstract code platform-standard object file is executed, it is dynamically linked to the execution routine. When the procedure is called, the execution routine is invoked. The execution routine executes the procedure by interpreting the abstract code or generating machine-code responsive to the abstract code. The execution routine may be an execution control unit which selects between various execution techniques based on runtime factors, such as the frequency with which the procedure is called.

21 Claims, 9 Drawing Sheets

METHOD AND APPARATUS FOR GENERATING PLATFORM-STANDARD OBJECT FILES CONTAINING MACHINE-INDEPENDENT CODE

FIELD OF THE INVENTION

The present invention relates to software development tools and more particularly to an apparatus and method for encapsulating machine-independent software code into platform-standard object files.

BACKGROUND OF THE INVENTION

A computer platform consists of a computer system running a particular operating system. Not all computer platforms are compatible with each other. Specifically, instructions executable on one platform are often not executable on another. To allow execution on multiple platforms, software is often initially written in a "high level" language. High level languages include instructions ("high level instructions") that are more general than the instructions which are actually executed on a platform. Since high level instructions are generally not directly executable on any computer system, they must first be convened to machine-specific code that is directly executable on a specific target platform. Files containing high-level instructions are referred to herein as high-level software modules.

Various programming approaches have been adopted for generating machine-specific programs based on high-level software modules. According to one approach, high-level software modules are first compiled into machine-specific object files by a compiler program. This approach is generally referred to herein as the pre-execution compilation approach. Typically, a given platform will have a standard format for machine-specific object files. Machine-specific object files which conform to the standard format of a given platform are referred to herein as platform-standard object files ("PSOFs"). Because platform-standard object files for a particular platform have a standard format, a single program may combine platform-standard object files generated from high-level software modules originally written in more than one high-level programming language. For example, a single program may be created from a first platform-standard object file compiled from a first high-level software module written in a first high-level programming language and a second platform-standard object file compiled from a second high-level software module written in a second high-level programming language.

Once the platform-standard object files for a program have been compiled, they are linked together to create the program. A link between platform-standard object files allows the platform-standard object fries to pass information to and invoke procedures defined within each other. The software modules may be linked statically (prior to program execution) or dynamically (during program execution). Since all platform-standard object files on a given platform have a standard format, a standard linker may be used to link the platform-standard object fries without regard to the high-level programming language in which the corresponding high-level software modules were written.

Software "libraries" and "toolkits" have been developed to allow programs to access particular functions. Typically, the functions are implemented in platform-standard object fries. Consequently, to access a library function within a program, a platform-standard object file of the program is simply linked to the toolkit platform-standard object file corresponding to the desired function.

According to another approach, each instruction of a high-level software module is convened "on-the-fly" into machine-specific code during program execution. This approach is generally referred to herein as the runtime compilation approach. Specifically, to execute a program represented in a high-level software module, the instructions contained in the high-level software module are read by a code-generator. The code generator converts the high-level instructions in the high-level software module into machine-specific instructions, and immediately sends the machine-specific instructions to a processor for execution.

According to yet another approach, each instruction of a high-level software module is fed into an interpreter program during program execution. This approach is referred to herein as the interpreter approach. The interpreter program causes program execution to jump to a precompiled block of machine-specific instructions corresponding to the current high-level instruction. Once the precompiled block of machine-specific instructions has been executed, the interpreter program determines the next high-level instruction to interpret responsive to the execution of the previously executed machine-specific instructions.

The execution speed, memory and resource requirements, error correction and maintenance ram-around time for a program depend in pan upon which of these program development approaches is used to generate the program. For example, code that is compiled prior to execution typically does not need to be linked to or distributed with interpreter or runtime code generation software. In addition, pre-compiled code generally executes faster than interpreted code because pre-compiled code does not have to share processing resources during execution with an interpreter or code generating process. However, code which has been completely compiled must be recompiled to incorporate even small changes. Compiled code also tends to be much larger than high-level instructions. Consequently, compiled code typically requires more storage space and more runtime resources.

In contrast, code which is compiled or interpreted "on-the-fly" ("run-time converted code") is generally smaller and requires fewer runtime resources. In addition, when code which is compiled on-the-fly or interpreted on-the-fly is revised, the code does not have to be compiled prior to program execution. On-the-fly code conversion also allows additional checking code to be generated at runtime without recompiling the original source code. Also, run-time convened code may be tailored for a particular execution environment. For example, different implementations of a single architecture may have slightly different instruction scheduling and delay properties. In one test, a sample program compiled for a first implementation of a given architecture ran 25% slower on a second implementation of the given architecture than the same program compiled for the second implementation. On-the-fly code conversion allows the same program representation to be used by both architectures with good performance properties on both. For another example, stub code tailored for a local object implementation is typically faster than generic stub code which handles both local and nonlocal object implementation. However, whether an object will be locally implemented may not be known until run-time. Using on-the-fly code conversion, it may be determined that an object is locally implemented before the stub code is generated. Based on this run-time information, faster, less generic stub code may be generated.

To realize the benefits of the various development approaches, hybrid programming environments have been developed. For example, systems have been developed which allow high-level software modules converted by on-the-fly code generators to call external platform-standard object files. The connections between the generated code and the external platform-standard object files are made by custom linkers. However, the custom linkers on some of the present hybrid systems do not allow external platform-standard object files to "call back" to the high-level software module being translated. Because call-backs are not supported, information only flows one way. Unfortunately, many platform-standard object files require two-way communication. Consequently, many platform-standard object files, software libraries and software toolkits are inaccessible to these systems.

Other hybrid systems have specialized linkers which do support callbacks and references from external code to variables defined in the generated code. Programs generated by these systems are able to take advantage of platform-standard object files generated by other programming environments. However, since these systems do not generate platform-standard object files themselves, programs generated in other programming environments cannot take advantage of the functions implemented in their high-level software modules.

Another hybrid program development system has been developed by the Microsoft Corporation. Certain versions of the Microsoft Corporation's C and C++ compiler allow program developers to compile all or selected portions of a source code program into platform-specific object ties which encapsulate "Pcode". The Pcode object files may be linked with machine code object files as well as other Pcode object files to create a program. Pcode instructions are not directly executable on a computer. Therefore, an object file which implements a run-time Pcode interpreter is also statically linked to the program containing the Pcode object files. During runtime, the Pcode interpreter interprets the Pcode instructions when a Pcode procedure is called.

Pcode instructions generally take less space than their machine-code equivalents. Pcode achieves this size reduction in part by making assumptions about the hardware which will run the program containing the Pcode. For example, Pcode assumes the existence of certain registers. Pcode also assumes the size and meaning of data types, such as "word", "short", "long", "near pointer", "far pointer", "huge pointer" etc. While these assumptions allow a significant reduction in executable program size, they inhibit the portability of Pcode. For example, a Pcode routine which assumes that a "word" is sixteen bits of information may not run properly on a platform where a "word" constitutes thirty-two bits of information.

Based on the foregoing, it is clearly desirable to provide a mechanism for encapsulating machine-independent software modules into platform-standard object files. It is further desirable to provide an on-the-fly code generation system which produces platform-standard object files accessible by platform-standard object files generated by other programming environments. It is further desirable to provide a program development environment which defers the code conversion process selection until program run-time. Finally, it is desirable to provide a mechanism for selecting an optimal code conversion technique during run-time.

SUMMARY OF THE INVENTION

According to one aspect of the present invention, a method for generating a platform-standard object file from a machine-independent software module is provided. The machine-independent software module contains abstract code defining at least one procedure. According to the method, the abstract code is analyzed to determine whether any global variables are defined in the machine-independent software module. If any global variables are defined in the machine-independent software module, then a list of definitions of the global variables is generated. The list of definitions is stored in the platform-standard object file. The abstract code procedure is analyzed to determine whether the abstract code procedure references any external variables or external procedures. If the abstract code procedure references any external variables or external procedures, then a list of symbol references indicative of the external variables or external procedures is generated. The list of symbol references is stored in the platform-standard object file. A sequence of machine instructions is generated for calling an execution routine when a client calls the abstract code procedure. The sequence of machine instructions is stored in the platform-standard object file. The abstract code is stored in the platform-standard object file.

The method may optionally include a step of compressing the abstract code prior to storing the abstract code in the platform-standard object file. The list of symbol references includes a symbol reference indicative of the execution routine. The execution routine may take a variety of forms. For example, the execution routine may be a routine for interpreting the abstract code of the abstract code procedure. The execution routine may alternatively be a routine for generating machine code responsive to the abstract code procedure during execution of a program which includes the abstract code procedure.

According to another aspect of the invention, a method for executing a computer program on a platform is provided. The computer program includes a first procedure implemented in a first platform-standard object file which calls a second procedure defined in abstract code contained in a machine-independent software module. The platform has a standard static linker. According to the method, a second platform-standard object file is generated based on the abstract code. The second platform-standard object file includes the abstract code. The first platform-standard object file is statically linked to the second platform-standard object file with the standard static linker. The second platform-standard object file is linked to an execution routine. The execution routine is invoked when the first procedure calls the second procedure. The execution routine causes the second procedure to be executed responsive to the abstract code.

According to one embodiment, the second platform-standard object file is dynamically linked to the execution routine during execution of the program. The execution routine may be an interpreter, a code generator, or an execution control routine which executes abstract code according to a plurality of execution techniques.

In an embodiment where the execution routine is an execution control routine which executes abstract code according to a plurality of execution techniques, the abstract code may be executed by selecting an execution technique from the plurality of execution techniques and executing the abstract code according to the selected execution technique. The plurality of execution techniques may include a technique for interpreting abstract code and a technique for generating machine code responsive to abstract code. The plurality of execution techniques may alternatively include a first technique generating machine code responsive to abstract code and a second technique for generating machine code responsive to abstract code, where the first technique generating code is relatively faster than the second technique and the second technique generates more efficient code relative to the first technique. An execution technique of the plurality of execution techniques may be selected responsive to the frequency with which the second procedure is called.

According to yet another aspect of the invention, an apparatus for generating a platform-standard object file from a machine-independent software module stored on a storage unit is provided. The machine-independent software module contains abstract code defining an abstract code procedure. The apparatus generally includes a global variable processing unit, an external reference processing unit, a call routine generation unit and an abstract code encapsulating unit.

The global variable processing unit is coupled to the storage unit. The global variable processing unit analyzes the abstract code to determine whether any global variables are defined in the machine-independent software module. If any global variables are defined in the machine-independent software module, then the global variable processing unit generates a list of definitions of the global variables and the list of definitions is stored in the platform-standard object file.

The external reference processing unit is coupled to the storage unit. The external reference processing unit analyzes the abstract code to determine whether the abstract code procedure references any external variables or external procedures. If the abstract code procedure references any external variables or external procedures, then the external reference processing unit generates a list of symbol references indicative of the any external variables or external procedures and the list of symbol references is stored in the platform-standard object file.

The call routine generation unit is coupled to the storage unit. The call routine generation unit generates a sequence of machine instructions for calling an execution routine when a client calls the abstract code procedure and the sequence of machine instructions is stored in the platform-standard object file. The abstract code encapsulating unit is coupled to the storage unit. The abstract code processing unit stores the abstract code in the platform-standard object file.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4b is a block diagram illustrating a statically linked execution file containing the abstract code platform-standard object file of FIG. 4a;

DETAILED DESCRIPTION OF THE PREFERRED EMBODIMENT

A method and apparatus for generating a platform-standard object file from a high-level software module is described. In the following description, for the purposes of explanation, numerous specific details such as software tools, platforms, operating systems and programming languages are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
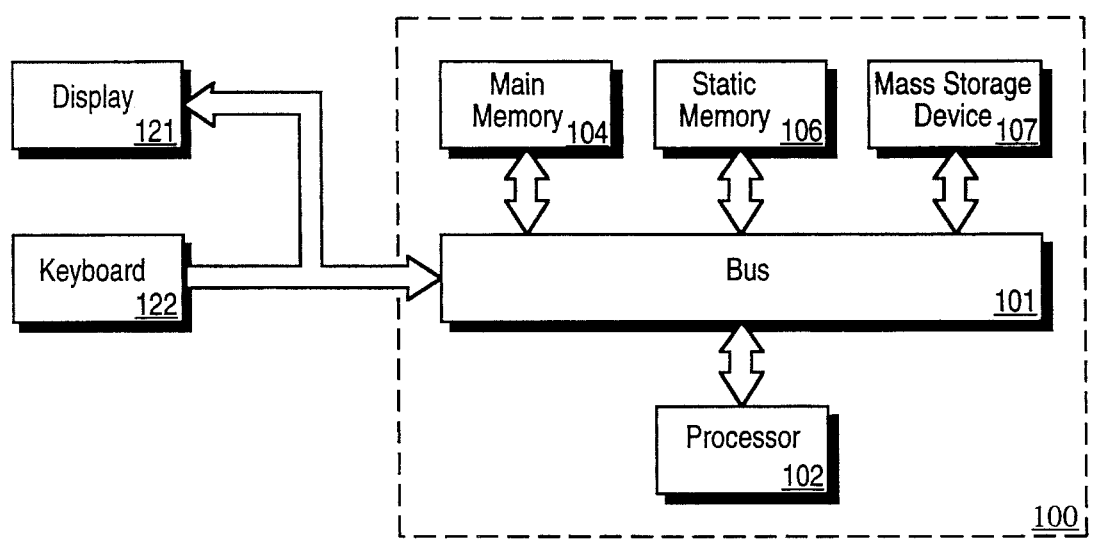
FIG. 1 is a block diagram of a computer system upon which the preferred embodiment of the present invention can be implemented.

Referring to FIG. 1, a computer system 100 upon which the preferred embodiment of the present invention can be implemented is shown. Computer system 100 comprises a bus or other communication means 101 for communicating information, and a processing means 102 coupled with bus 101 for processing information. Computer System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102.

The present invention is related to the use of computer system 100 to develop executable programs. In the currently preferred embodiment, computer system 100 is configured to run the UNIX System V operating system. Computer system 100 creates runtime programs from source code by executing a plurality of programming tools which process the code. The various processing phases involved in the creation of an executable file shall now be described in greater detail with reference to FIG. 2a.

Figure 2A:
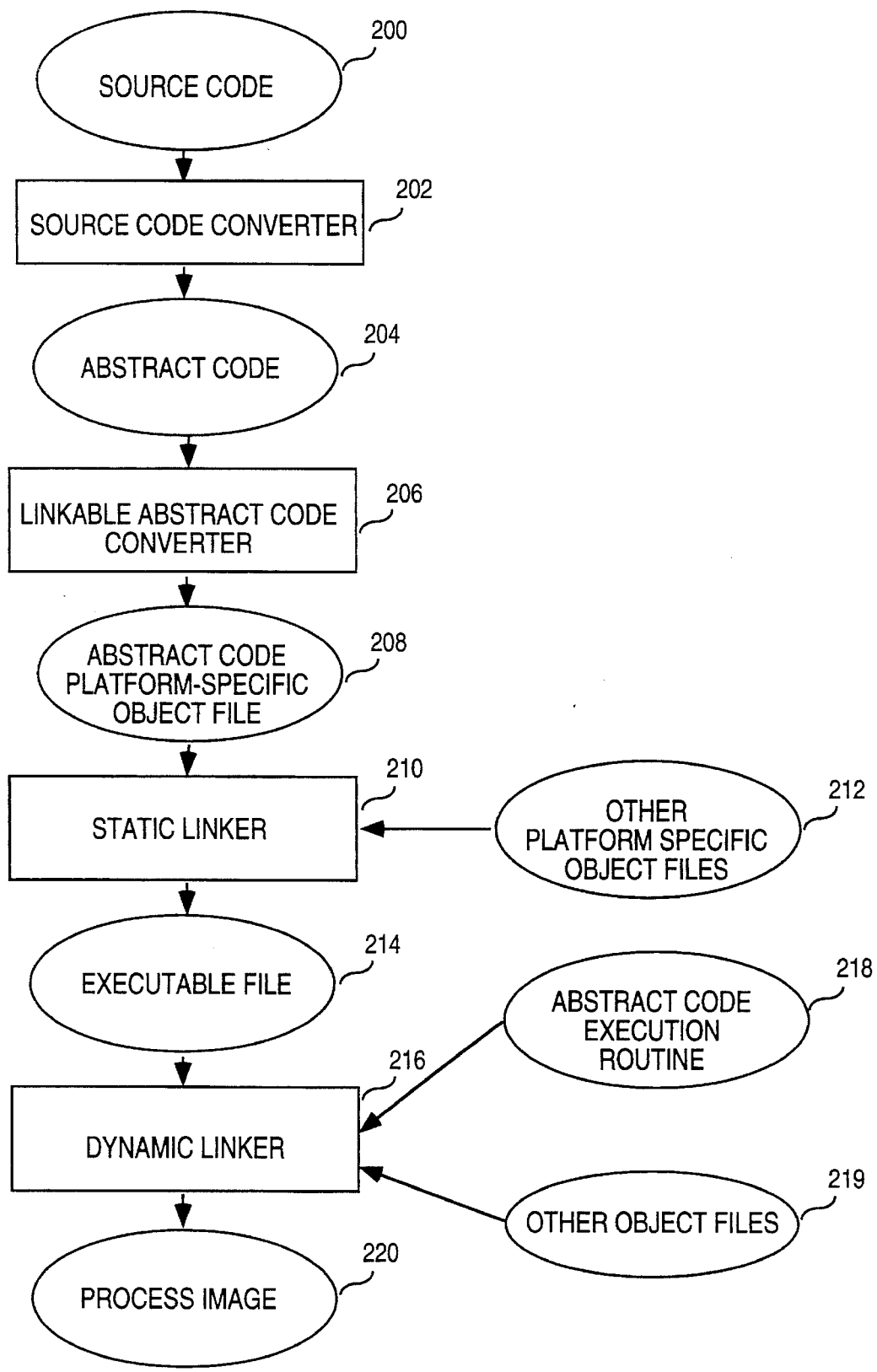
FIG. 2a is a data flow diagram illustrating software development according to an embodiment of the invention.

FIG. 2a is a data flow diagram illustrating the processing phases of software development according to one embodiment of the invention. In FIG. 2a, data is illustrated with ovals, and the programming tools which process and convert the data are illustrated with rectangles. Between processing phases, the data is preferably stored either in memory 104 or on storage device 107. The programming tools are initially stored on storage device 107, and are loaded into memory 104 prior to execution by processor 102.

Prior to the first stage of the conversion process, a software developer creates a source code file which describes one or more procedures in high-level language, such as Pascal or C++. Source code 200 generally represents a file containing source code instructions.

During the first phase of the executable file creation process, a source code converter 202 reads the source code 200 and converts the source code 200 to machine-independent code (abstract code) 204. Typically, the source code 200 exists as a file on storage device 107. However, the source code 200 may alternatively be read from memory 104, if, for example, the source code converter 202 is invoked directly from a program editor.

Figure 3A:
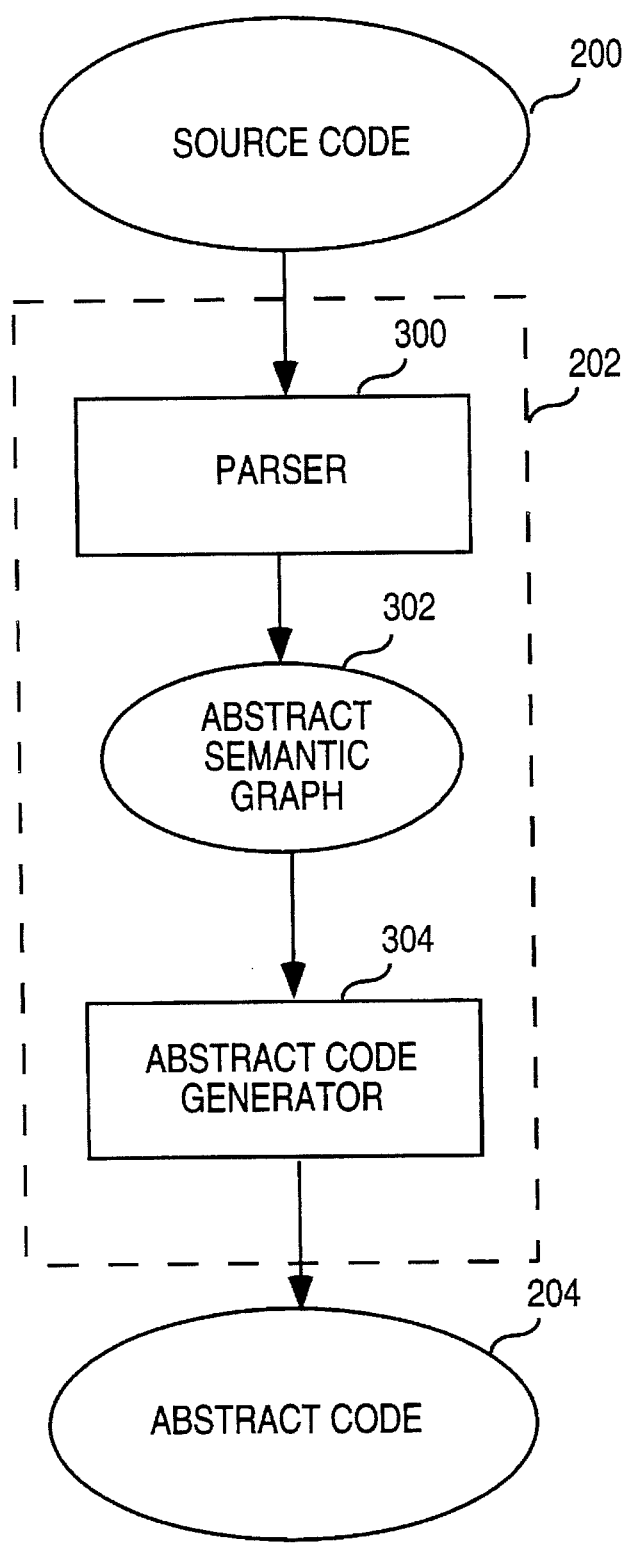
FIG. 3a is a block diagram illustrating the source code converter of FIG. 2a in greater detail.

Source code converter 202 is illustrated in greater detail in FIG. 3*a*. The source code converter 202 generally includes a parser 300 and an abstract code generator 304. The parser 300 reads the source code 200 and generates an abstract semantic graph 302 based thereon. The abstract semantic graph 302 is a data structure which represents the procedures defined in the source code 200.

The abstract code generator 304 reads the abstract semantic graph 302 and generates abstract code 204 based on the abstract semantic graph 302. Abstract code generator 304 generates abstract code 204 which conforms to a particular abstract code language.

Abstract code includes both machine-independent interpreted code and machine-independent descriptions of program components. Abstract code differs front Pcode generated by Microsoft Corporation s C and C++ compilers in that abstract code makes no assumptions about the platform on which the program will ultimately execute. For example, abstract code explicitly states the size of every data type used in the procedures it defines. Thus, even if a source code language assumes that an integer is four bytes long, the abstract code generated from the source code will define a corresponding data type which expressly states that an integer is four bytes long.

Thus, abstract code is significantly more portable than other forms of program representation used in the prior art. For example, an abstract procedure which operates on an integer may be accurately executed without modification on two platforms which define "integer" differently. This machine independence is achieved because the abstract code itself explicitly defines what is meant by "integer." It does not rely on platform-specific type definitions or platform-specific hardware futures.

The abstract code 204 is initially generated as a linked data structure in memory 104. The fields of the linked data structure correspond to abstract code program elements. Those programming elements shall now be described with reference to a sample portion of a machine-independent software module listed in Appendix I. It will be understood that the specific structure, grammar, syntax and lexemes of the sample machine-independent software module conform to a specific abstract code language. However,-the abstract code language reflected in the sample portion of a machine-independent software module is merely exemplary. The present invention is not limited to any specific abstract code language. Therefore, abstract code generator 304 may alternatively generate abstract code 204 which conforms to any abstract code language (i.e. any programming language which makes no assumptions about the hardware on which a program will be executed).

Referring now to the machine-independent software module portion illustrated in Appendix I, the machine-independent software module has a type definition section which defines the data types used and/or returned by the procedures defined in the machine-independent software module. The type definition section of the abstract code module illustrated in Appendix I begins with the word "Types:". For each data type listed, the abstract code explicitly states the size (width) of the data type and whether the data type is signed. For example, data type 0 is a signed integer that is 32 bits wide.

The type definition section is followed by a global variable definition section. In the global variable definition section, the variables used in the procedures defined in the machine-independent software module which are to be accessible to procedures other than those defined in the machine-independent software module (external procedures) are defined. Each global variable is of a data type defined in the type definition section. For example, the global variable "outi" is defined as a variable type 0.

The global variable definition section is followed by a procedure definition section. The procedure definition section contains definitions for the one or more procedures represented in the machine-independent software module. The sample machine-independent software module has three procedures: ".init", "shellsort", and "main". Each procedure definition includes a variety of sections including a global reference section, an argument section, and an instruction section. The global reference section lists the references which a procedure makes to global variables and/or other procedures. For example, the procedure ".init" references the global variable "a". The argument section lists values which must be passed to the procedure when the procedure is invoked. For example, the variable "n" is an argument for the "shellsort" procedure. The references may refer to variables that are defined in PSOFs other than the PSOF that is making the reference. These references are referred to as external references.

The instruction section lists the abstract code instructions which define the steps performed by the procedure. To retain full platform independence, the abstract code instructions do not make reference to any specific hardware elements, such as hardware-specific registers.

While abstract code 204 may be generated from source code 200 as described above, abstract code 204 may alternatively be directly coded by a programmer. By directly coding abstract code 204, a programmer may be able to optimize abstract code procedures based on information which would not be discernible from source code 200. However, the use of source code converter 202 is generally preferred so that programmers may initially write procedures in a high level language with which they are already familiar.

Returning now to FIG. 2*a*, once abstract code 204 has been created, a linkable abstract code converter 206 converts the abstract code 204 into an abstract code PSOF 208. The linkable abstract code converter 206 may be configured to read abstract code 204 while it is represented as linked data structures in memory 104, or after it is saved as a machine-independent software module on storage device 107.

Abstract code PSOF 208 is a PSOF which encapsulates abstract code 204. In the preferred embodiment, the operating platform is UNIX System V. The standard format for object files on UNIX System V is known as Executable and Linking Format or "ELF". ELF is described in System V, Application Binary Interface, revised edition, UNIX System Laboratories, Inc. (1992) at pages 4-1 to 4-33. The contents of abstract code PSOF 208 and the mechanism by which linkable abstract code converter 206 converts abstract code 204 to abstract code PSOF 208 shall now be described in greater detail with reference to FIGS. 3b and 4a.

Figure 4A:
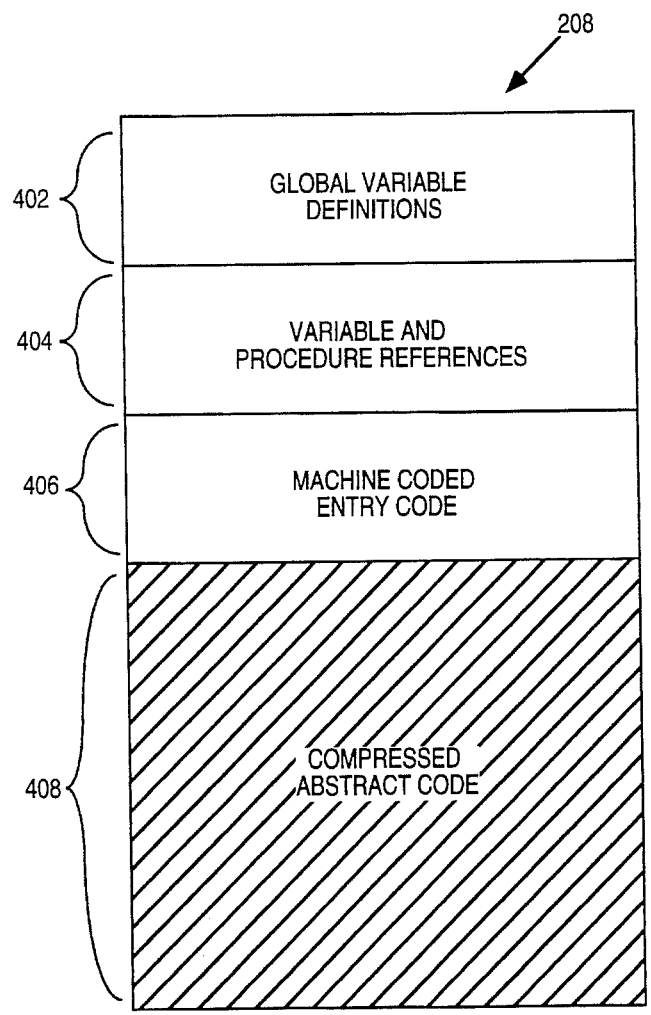
FIG. 4a is a block diagram illustrating the structure of an abstract code platform-standard object file according to one embodiment of the invention.

FIG. 4a illustrates the main components of abstract code PSOF 208. Abstract code PSOF 208 generally includes a global variable definition section 402, a variable and procedure reference section 404, a machine coded entry code section 406 and a compressed abstract code section 408. An exemplary abstract code PSOF is listed in Appendix II. The exemplary abstract code PSOF in Appendix II is an object file which conforms to the ELF standard. The exemplary abstract code PSOF in Appendix II was generated based on the exemplary abstract code program listed in Appendix I.

As will be described hereafter, PSOFs are combined with other PSOFs to create an executable file or program. The PSOFs are combined to allow each PSOF in a program to communicate with other PSOFs. For any given PSOF, such communication may include, for example, invoking procedures defined in other PSOFs and referencing global variables defined in other PSOFs.

Invoking a procedure defined in another PSOF may involve calling the procedure, passing parameters to the procedure, and reading a returned value from the procedure. A global variable defined in another PSOF is referenced, for example, to allow a value to be written to the storage location associated with the variable and to allow the value stored in the storage location associated with the variable to be read.

To enable full communication between PSOFs, each PSOF must provide information about how it communicates with other PSOFs and how other PSOFs may communicate with it. A PSOF indicates how it communicates with other PSOFs by specifying (1) the variables defined in other PSOFs which are accessed by its procedures and (2) the procedures defined in other PSOFs which its procedures call. A PSOF indicates how other PSOFs may communicate with it by specifying (1) its variables that other PSOFs may access and (2) how other PSOFs may call its procedures. Each PSOF provides this information in a form and format which is known to the standard linker of the target platform. Because the form and format required by standard linkers on different platforms are not uniform, the form and format in which each PSOF must express this information is platform-specific.

As explained above, the global variable definition section 402, which specifies the variables defined in abstract code 204 that other PSOFs may access, must be stored in a platform-specific format. The global variable definition section of exemplary abstract code PSOF in Appendix H follows the comment "Global variable definitions". The form and format of the global variable definition section of the exemplary abstract code PSOF conforms to the specifications of UNIX System V.

The variable and procedure reference section 404 specifies the variables and procedures of other PSOFs which are accessed by the procedures defined in abstract code 204. The variable and procedure reference section 404 is also stored in a platform-specific form and format. The variable and procedure reference section of the exemplary abstract code PSOF in Appendix H follows the comment "Global variable references". The form and format of the variable and procedure reference section of the exemplary abstract code PSOF conforms to the specifications of UNIX System V.

The machine-coded entry code section 406, which specifies how other PSOFs access the procedures defined in abstract code 204, is also stored in a platform-specific form and format. The machine-coded entry code section of the exemplary abstract code PSOF in Appendix II follows the comment "Trampolines for procedures". The form and format of the machine-coded entry code of the exemplary abstract code PSOF conforms to the specifications of UNIX System V.

In most platforms, PSOFs employ machine-specific instructions to specify "entry points" to allow other PSOFs to call their procedures. For example, PSOFs which conform to the UNIX System V standard must specify entry-points to the procedures they define through use of a series of machine-specific instructions. Consequently, the machine-coded entry code section of exemplary abstract code PSOF of Appendix II includes a short series of machine-specific instructions for each procedure defined in the exemplary abstract code PSOF. For example, see the machine-specific instructions listed between the label "init_for_shell_sort" and the comment "End of proc init_for_shell_son" in the exemplary abstract code PSOF.

Typical PSOFs include machine-specific instructions which implement their procedures. Consequently, for a typical PSOF, a machine-coded entry code section includes a series of machine instructions which implement the procedure.

In contrast with typical PSOFs, abstract code PSOF 208 does not include machine-specific instructions which implement its procedures. Rather, it contains compressed abstract code 408 which defines its procedures in a machine-independent manner. See, for example, the instructions following the comment "Instructions for proc init_for_shell_ son" in the exemplary abstract code PSOF.

As has been explained above, abstract code is not directly executable. Consequently, the machine-coded entry code section 406 of abstract code PSOF 208 does not contain instructions which directly execute compressed abstract code section 408 of abstract code PSOF 208. Rather, machine-coded entry code section 406 includes machine-specific instructions which, when executed, will cause a processor to invoke an execution routine which will execute the compressed abstract code 408 during runtime.

Compressed abstract code 408 includes all of the information contained in abstract code 204 in a compressed format. The information is compressed to reduce the size of abstract code PSOF 208, and therefore the size of any executable file which incorporates abstract code PSOF 208. According to one embodiment, compressed abstract code 408 may be compressed as illustrated in the exemplary abstract code PSOF in Appendix H. While the exemplary abstract code PSOF illustrates one form of compression, any lossless compression technique may be used. However, as will be explained hereafter, the compressed abstract code for any given procedure must be decompressed during runtime the first time the procedure is called. Therefore, compressed abstract code 408 is preferably produced by a compression technique which will not cause relatively significant decompression delays. According to one embodiment, the abstract code may be encapsulated in abstract code PSOF 208 without compression. Use of uncompressed abstract code would result in some execution speed gain at the expense of the increased size of abstract code PSOF 208.

Figure 3B:
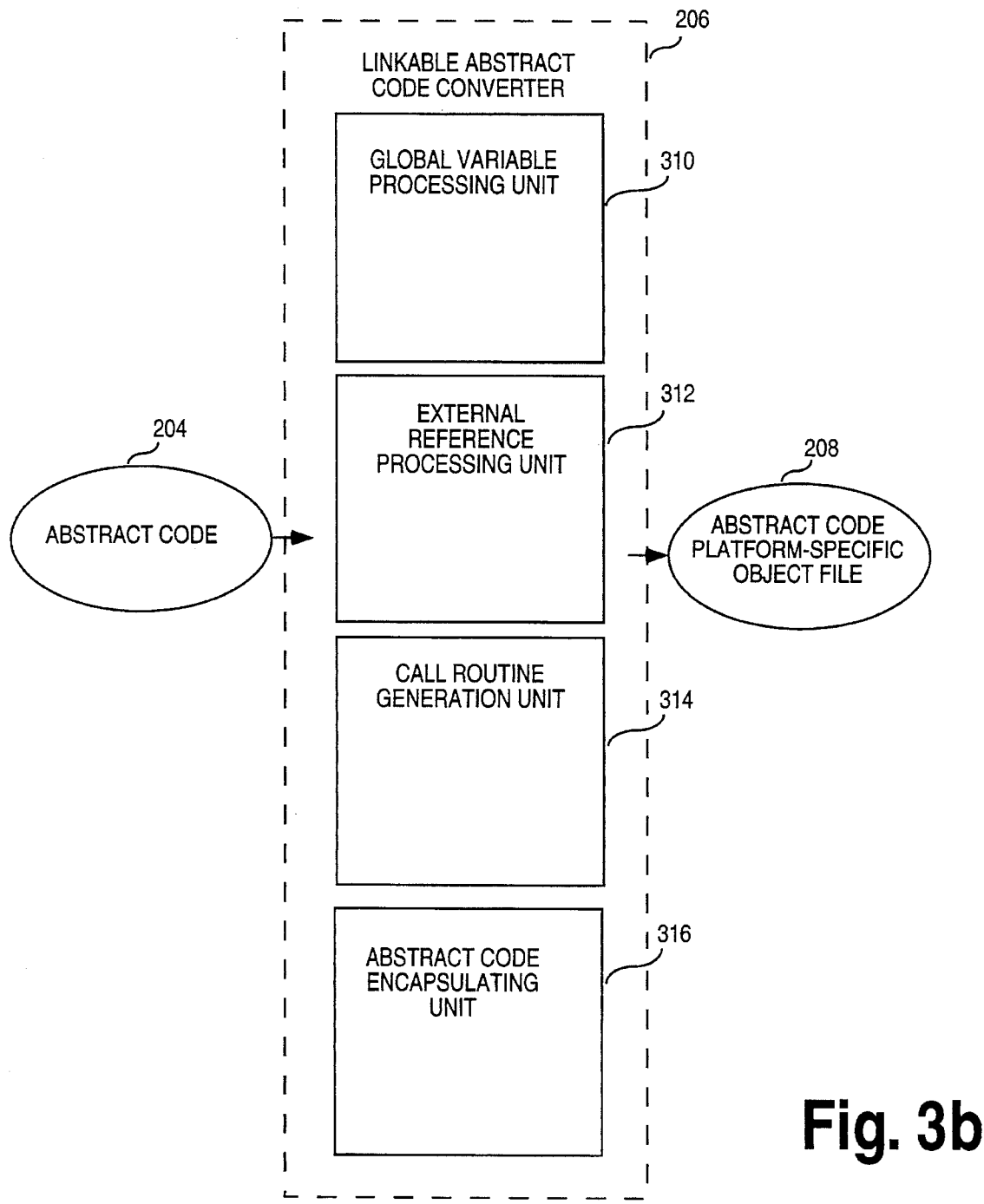
FIG. 3b is a block diagram illustrating the linkable abstract code converter of FIG. 2a in greater detail.

FIG. 3b illustrates linkable abstract code converter 206 in greater detail. Abstract code converter 206 generally includes a global variable processing unit 310, an external reference processing unit 312, a call routine generation unit 314, and an abstract code encapsulating unit 316. Global variable processing unit 310, external reference processing unit 312, call routine generation unit 314 and abstract code encapsulating unit 316 read abstract code 204 and generate, respectively, global variable definition section 402, variable and procedure reference section 404, machine-coded entry code section 406 and compressed abstract code section 408. The processing performed by units 310, 312, 314 and 316 may be performed sequentially or simultaneously. Preferably units 310, 312, 314 and 316 are implemented in a single process performed by processor 102.

Returning now to FIG. 2a, since abstract code PSOF 208 conforms to the standard object format of a platform, it may be linked by a standard static linker 210 to one or more other PSOFs 212 to create another PSOF or executable file. Under UNIX System V, there are two general types of PSOFs: a relocatable object file and a shared object file. The term PSOF is used herein to designate all forms of object files which are supported by a platform s standard linker. FIG. 2a illustrates the case where abstract code PSOF 208 is statically linked to other PSOFs 212 to create an executable file 214. The standard static linker for statically linking ELF object ties in the UNIX System V platform is UNIX ld.

Figure 4B:
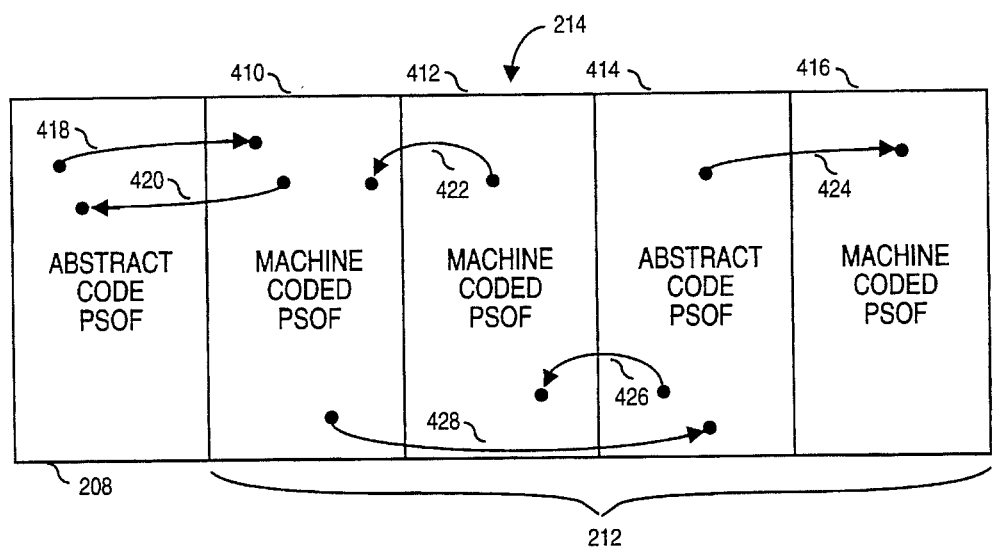

FIG. 4b illustrates executable file 214 in greater detail. In addition code PSOF 208, executable file 214 includes a plurality of machine-coded PSOFs 410, 412, and 416, and a second abstract code PSOF 414. Machine-coded PSOFs 410, 412 and 416 generally represent PSOFs which contain machine-coded procedures. In contrast, abstract code PSOFs 208 and 414 contain procedures defined in abstract code (or compressed abstract code).

Static linker 210 creates executable file 214 by resolving inter-PSOF references. Inter-PSOF references may include calls from procedures in one PSOF to procedures in another PSOF and the access of variables defined in one PSOF by procedures defined in another PSOF. Static linker 210 is able to determine and resolve inter-PSOF references by inspecting the global variable definition section, variable procedure and reference section, and machine-coded entry code section of each PSOF.

For example, abstract code PSOF 208 may include a procedure which uses a variable defined in machine-coded PSOF 410, and machine-coded PSOF 410 may call a procedure defined in abstract code PSOF 208. Consequently, static linker 210 replaces the external variable reference in abstract code PSOF 208 with a pointer or address to the variable defined in machine-coded PSOF 410. The resolution of an external reference creates a link between the referenced procedures ("implementations") and the referencing procedures ("clients"). The link corresponding to the resolution of the variable reference made by machine-coded PSOF 410 is illustrated by an arrow 418.

Static linker 210 will also replace the procedure call in machine-coded PSOF 410 with a call to the entry code corresponding to the referenced abstract code procedure in abstract code PSOF 208. Consequently, when, during the execution of the machine-coded procedure in PSOF, the call to the referenced procedure is made, the entry code corresponding to the reference abstract code procedure will be invoked. An arrow 420 illustrates the link caused by the resolution of the external procedure call.

A plurality of arrows 422, 424, 426 and 428 illustrate the resolution of other inter-PSOF references. Typically, static linker 210 resolves all references between the PSOFs contained in an executable file. However, the PSOF s within executable 214 may reference variables and call procedures which are not defined in any of the other PSOFs in executable file 214. Such references remain unresolved until runtime.

Referring again to FIG. 2a, all of the previously discussed processing steps take place prior to program execution. After the above-enumerated steps have been completed, storage device 107 will be storing executable file 214 in which at least one procedure is defined in abstract code.

At runtime, executable file 214 is loaded into memory 104. At that same time, a dynamic linker 216 is invoked. Prior to the execution of the process defined in executable file 214, the dynamic linker 216 resolves all unresolved external variable references and procedure calls. This dynamic linking process which occurs is similar to the static linking process, with the exception that the external references are resolved only during program execution, and the files which define the referencing and referenced procedures are not combined into a single file.

As explained above, the machine-coded entry code section 406 of abstract code PSOF 208 does not directly invoke the abstract code procedures defined in abstract code PSOF 208. Rather, the machine-coded entry code 406 calls a routine which interprets or generates machine code for the procedures defined in abstract code PSOF 208. Such an execution routine may be statically linked to abstract code PSOF 208 in executable file 214 prior to runtime. However, in the preferred embodiment, an abstract code execution routine 218 is dynamically linked to the executable file 214.

The abstract code execution routine 218 is a routine for executing machine code instructions based on the abstract code instructions in the executable file 214. As will be described hereafter, abstract code execution routine 218 may be an on-the-fly code generator, an interpreter, or a routine which selects between two or more code generators or interpreters based on various operational factors. When PSOFs with compressed abstract code are used, abstract code execution routine 218 decompresses a compressed abstract code procedure the first time it is called prior to interpreting or generating code for the abstract code procedure.

Other object files 219 may be loaded at runtime along with the abstract code execution routine 218. Object files 219 are loaded into a running program at execution time in response to program requests. Object files 219 may include both abstract code PSOFs and machine-coded PSOFs.

Once linked to executable file 214, the abstract code execution routine 218 is invoked whenever an abstract code procedure within executable file 214 is invoked. The executable file 214 linked to the abstract code execution routine constitutes a single process image 220. Process image 220 is generally illustrated in FIG. 5a.

Figure 5A:
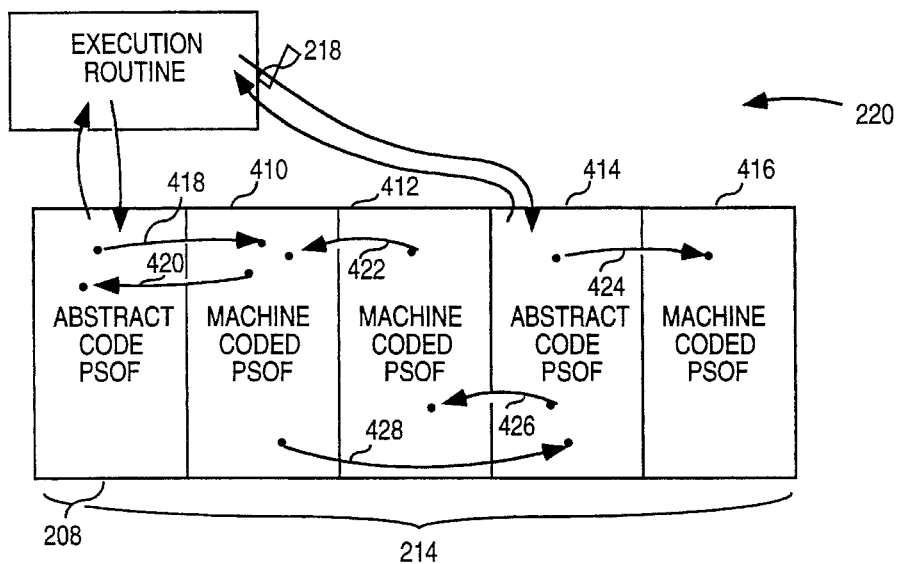
FIG. 5a is a block diagram illustrating an execution routine dynamically linked to an abstract code execution routine according to an embodiment of the invention.

Referring to FIG. 5a, executable file 214 is linked to execution routine 218 by a plurality of dynamic links 512 and 514. Dynamic links 512 generally represent the references in executable file 214 to execution routine 218. As explained above, these references occur in the machine-coded entry code corresponding to each abstract code procedure contained in executable file 214. Dynamic links 514 generally represent references made by the execution routine back to executable file 214.

Because the abstract code execution routine 218 is linked to the executable file 214 at runtime, the decision as to what type of execution routine to use may be deferred until that time. The ability to defer this decision allows a user to tailor the execution of process image 220 based on factors which are not known at the time the object files are statically linked to create the executable file 214. For example, if the executable file 214 is to be run during hours of relatively low computing activity, a user may cause the executable file 214 to be dynamically linked to a code generating routine. Code generators generally provide increased execution speed at the expense of greater resource requirements. Conversely, at a time of high computing activity, a user may cause the executable file 214 to be dynamically linked to an abstract code interpreter to minimize resource requirements.

The abstract code execution routine 218 may be, for example, an on-the-fly code generator. Consequently, when an abstract code procedure within executable file 214 is called, abstract code execution routine 218 reads the abstract code of the abstract code procedure, generates machine-code responsive to the abstract code, and immediately sends the machine-code to processor 102 for execution. According to alternative embodiment, abstract code execution routine 218 may be an abstract code interpreter. Consequently, when an abstract code procedure within executable file 214 is called, abstract code execution routine 218 will read a first abstract code instruction in the abstract code procedure and cause processor 102 to jump to a precompiled series of machine-code instructions corresponding to the first abstract code instruction. Once the execution of the series of machine-code instructions has been completed, the abstract code execution routine 218 reads a second instruction in the abstract code procedure and causes processor 102 to jump to a precompiled series of machine-code instructions corresponding to the second abstract code instruction. This interpreting process continues until the abstract code procedure terminates.

According to yet another embodiment, abstract code execution routine 218 may be an execution control unit. An execution control unit implements a routine which does not execute machine code based on object code, but is configured to selectively invoke two or more routines which do.

Figure 5B:
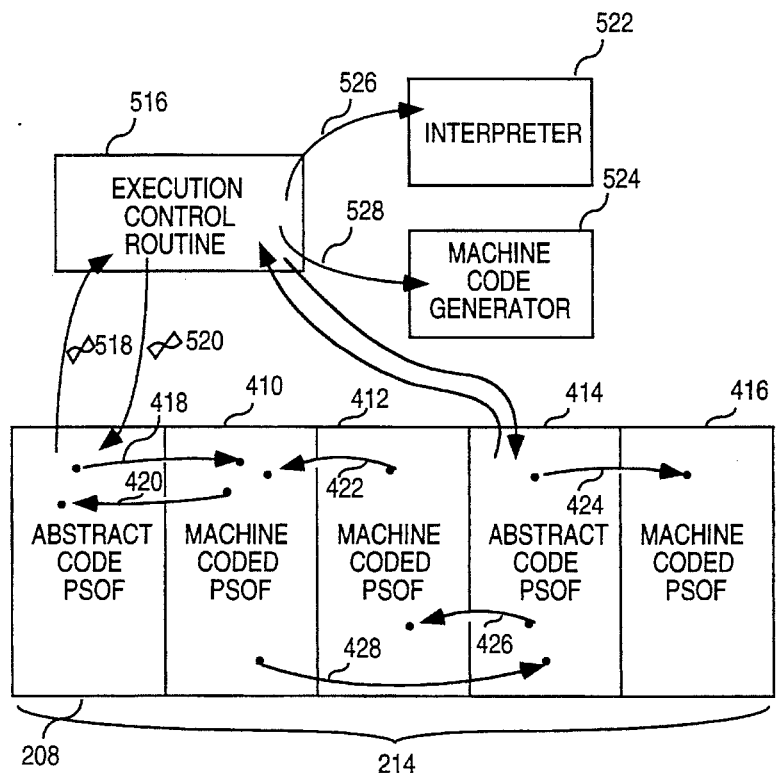
FIG. 5b is a block diagram illustrating an execution control routine dynamically linked to an abstract code execution routine according to an alternative embodiment of the invention.

FIG. 5b illustrates executable file 214 linked to an execution control routine 516. The execution control routine 516 is dynamically linked to executable file 214 to create process image 220 in the same manner as execution routine 218. However, execution control routine 516 is also linked to both an on-the-fly code generator 524 and an abstract code interpreter 522.

When an abstract code procedure within executable file 214 is called, the execution control routine 516 invokes either the code generator 524 or the interpreter 522. The choice of which execution unit to invoke may be made based on statistics maintained by the execution control routine 516 about each abstract code procedure. For example, the execution control routine 516 may keep track of how many times each abstract code procedure is called. The first time a given abstract code procedure is called, the execution control routine 516 may invoke the interpreter 522 to interpret the abstract code instructions. The second time a given abstract code procedure is called, the execution control routine 516 may invoke the code generator 524 based on the assumption that the abstract code procedure will be called frequently enough to justify the space and time required for the on-the-fly compilation. The generated machine code is directly invoked for any subsequent calls to the abstract code procedure.

Rather than select between a code generator 524 and an interpreter 522, the execution control routine 516 may be configured to select between two methods of code generation. When an abstract code procedure is initially called, the execution control routine 516 may cause a code generator to generate code quickly without much care as to the efficiency of the code generated. When an abstract code procedure is repeatedly called, the execution control routine 516 may cause a new series of machine code to be generated which implements the abstract code procedure with greater efficiency. Generally, the generation of more efficient code takes longer. However, in cases where a procedure is frequently called, the additional time spent during the generation of relatively efficient code is compensated for by the time saved due to the codes increased efficiency.

It should be understood that frequency of call is only one example of the factors execution control routine 516 considers in selecting between code execution methods. For example, execution control unit 516 may additionally or alternatively select an execution method based on the size of the process image and/or the amount of resources available during run-time. For example, if the process image is already very large, an interpretation method may be employed. However, if a large amount of memory is currently unused, then a machine-code generating method may be selected.

According to one embodiment, the execution control unit stores history data on storage device 107 indicative of the frequency with which the abstract code procedures where called. Under these circumstances, the execution control unit may initially select a execution method based on statistics from a prior runtime session. For example, if a given abstract code procedure is called frequently during one session, then the execution control routine 516 could store history data indicating that the given abstract code procedure is frequently called. Consequently, during a subsequent execution of the executable file 214, the execution control routine 516 may cause highly efficient source code to be generated for the given abstract code procedure the first time it is called.

Figure 2B:
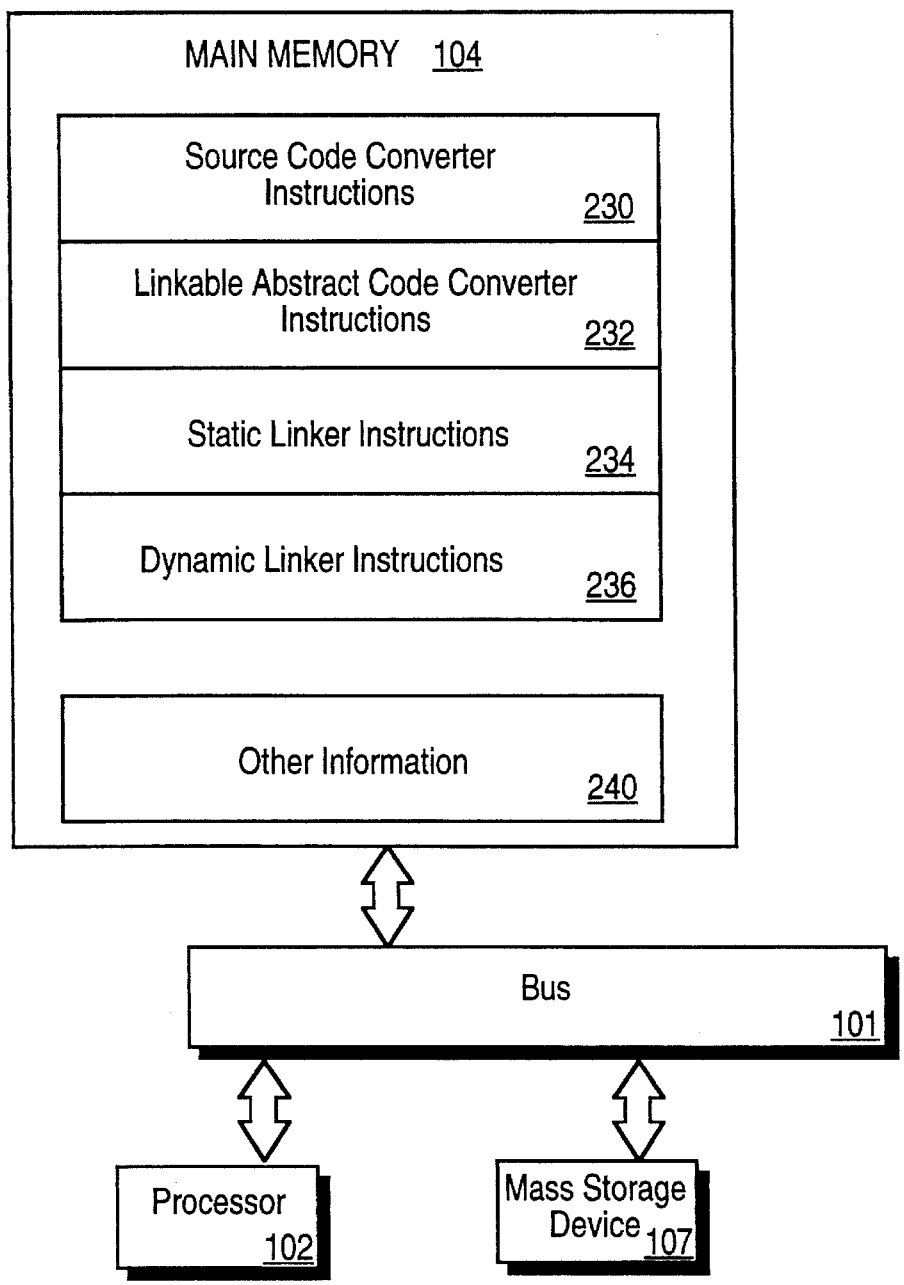
FIG. 2b is a block diagram illustrating the tools of FIG. 2a as software modules stored in memory, according to an embodiment of the invention.

The programming tools illustrated in FIG. 2a have been described herein as functional units. These functional units may be implemented in a variety of ways. For example, each functional unit may be implemented in a separate, hard-wired circuit. Alternatively, all of the functions can be hard-wired in one single circuit. In the preferred embodiment, the functions are not hard-wired. Rather, the functional units are implemented in software modules that contain instructions for performing the described functions. FIG. 2b illustrates a software-implementation of the invention.

Referring to FIG. 2b, main memory 104 stores a plurality of software modules which can be accessed by processor 102 via bus 101. These software modules may initially be stored on mass storage device 107, and loaded into main memory 104 via bus 101 prior to execution. When processor 102 executes a software module, the functions defined in the software module are performed.

Main memory 104 also contains storage for other information 240, such as data structures and values that are manipulated by processor 102 in response to execution of instructions. For example, the other information 240 stored in main memory 104 may include the source code 200 while processor 102 is executing the source code converter instructions 230.

For example, to implement the tools illustrated in FIG. 2a, main memory 104 may store source code converter instructions 230 which, when executed, perform the functions of source code converter 202; linkable abstract code converter instructions 232 which, when executed, perform the functions of linkable abstract code converter 206; static linker instructions 234 which, when executed, perform the functions of static linker 210; and dynamic linker instructions 236 which, when executed, perform the functions of dynamic linker 216. Typically, main memory 104 will only store the software module that contains the instructions currently being executed by processor 102, rather than all of the software modules simultaneously.

When the functional units are implemented by hard-wired circuitry, the circuitry corresponding to each functional unit is physically connected by conductors to those circuits with which the circuitry must communicate. In a software-implemented embodiment, the same circuitry (the circuitry within processor 102) performs the functions of all of the software modules. However, even in the software-implemented embodiment, two functional units are considered to be "coupled" when information is communicated between them.

Figure 6:
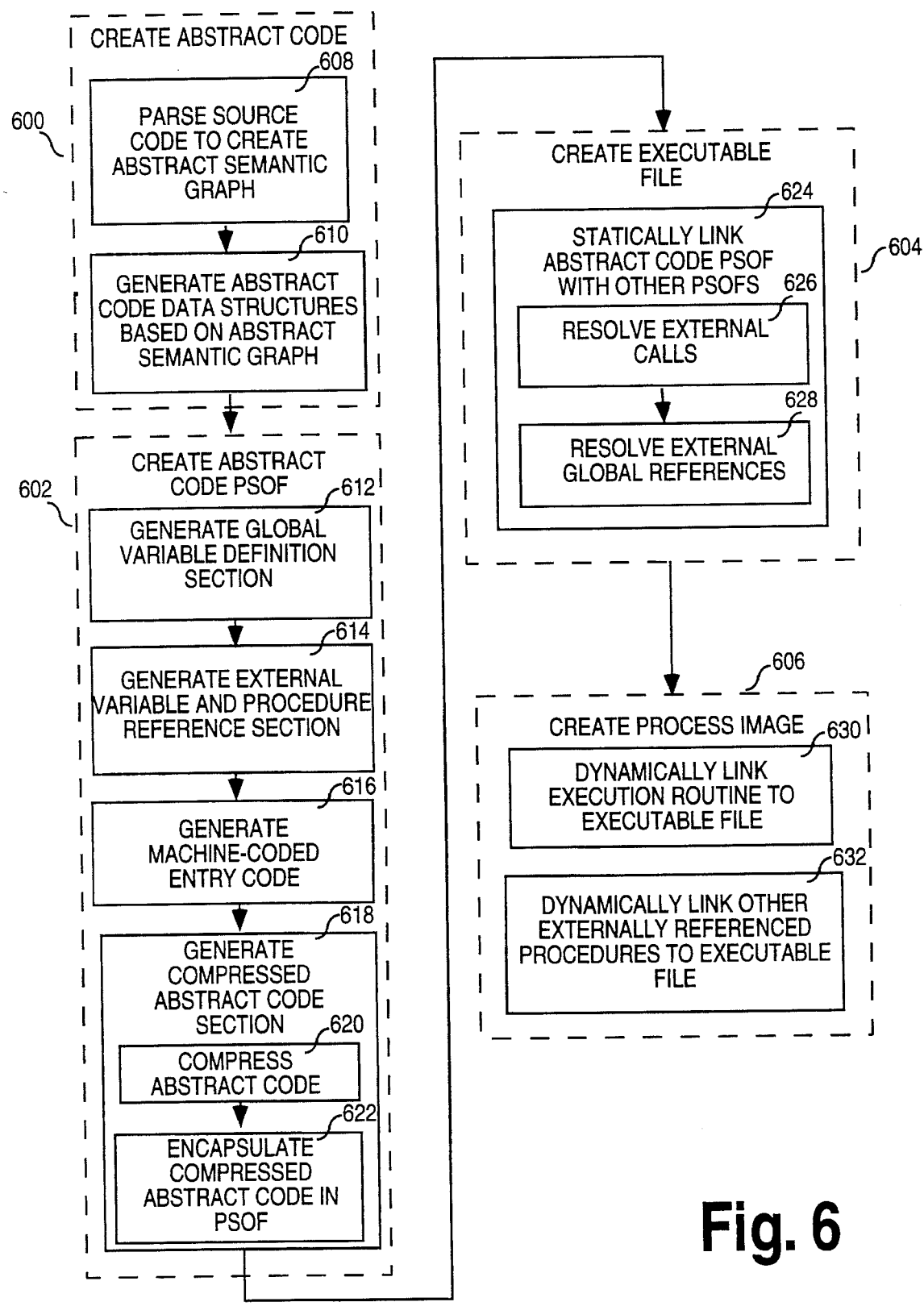
FIG. 6 is a flow chart illustrating the steps for creating a process image from some code according to one embodiment of the invention.

FIG. 6 illustrates a flow chart of the process for generating a process image based on source code. The process includes the general steps of creating abstract code based on the source code (step 600), creating an abstract code PSOF based on the abstract code (step 602), creating an executable file which includes the abstract code PSOF (step 604), and creating a process image based on the executable file (step 606).

To create abstract code responsive to source code, the source code is parsed at step 608 to create an abstract semantic graph. At step 610 abstract code is generated based on the abstract semantic graph. As explained above, the abstract code initially takes the form of a linked file structure.

To create an abstract code PSOF based on abstract code, a global variable definition section is generated (step 612), an external variable and procedure reference section is generated (step 614), machine-coded entry code is generated (step 616) and a compressed abstract code section is generated (step 622). The generation of the compressed abstract code section includes a step 620 of compressing the abstract code and a step 622 of encapsulating the compressed abstract code in the abstract code PSOF. These steps may be performed by directly reading the abstract code data structures from memory, or by reading a machine-independent software module that has been previously written to a storage device.

To create an executable file, the abstract code PSOF created at step 602 is linked statically with other PSOFs at step 604. As explained above, this step involves resolving calls made from procedures in one PSOF to procedures in other PSOFs (step 626), and resolving references made by procedures in one PSOF to variables defined in other PSOFs (step 628).

Preferably, the steps described above are performed prior to runtime. At runtime, a process image which implements the process defined in the executable file is created. The process image is created by dynamically linking the executable file to an execution routine (step 630). The execution routine is any routine for executing procedures defined in abstract code. For example, the execution routine may be an interpreter, an on-the-fly code generator, or an execution control routine which selectively invokes an interpreter or on-the-fly code generator. The executable file is also dynamically linked to any other externally referenced procedures (step 632).

Figure 7:
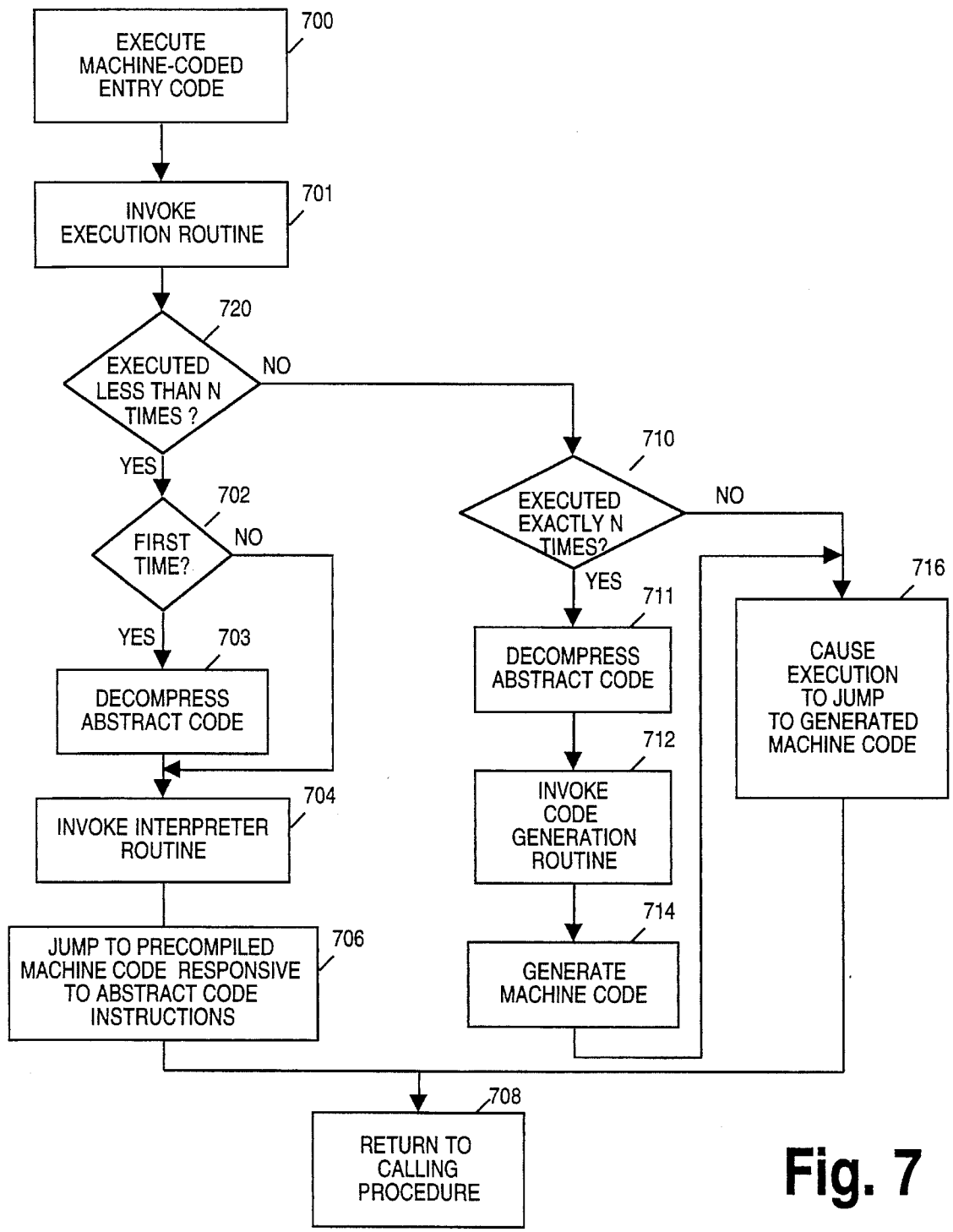
FIG. 7 is a flow chart illustrating a method for executing an abstract code procedure at runtime.

Once a process image is created, the process image is executed to perform the process defined in the process image. During the execution of the process image, procedures which are defined in abstract code within the image may be called. Because abstract code is not directly executable, procedures defined in abstract code cannot be handled in the same way as machine-coded procedures. FIG. 7 illustrates a flowchart of a method for handling a call to a procedure which is represented in compressed abstract code in the process image.

At step 700, the machine-coded entry code corresponding to the abstract code process is executed. The machine-coded entry code invokes an execution routine at step 701. In the present example, the execution routine is an execution control unit which selects an execution method based on the number of times an abstract code process is called. Therefore, at step 720, the execution control unit determines whether the particular abstract code procedure has been called less than N number of times. If the particular abstract code procedure has been called less than N number of times, then control passes to step 702. Otherwise, control passes to step 710.

At step 702, the execution control unit determines whether this is the first time the particular abstract code procedure has been called. If it is the first time the abstract code procedure has been called, then control passes to step 703, otherwise control passes to step 704.

If it is the first time the abstract code procedure is called, the abstract code which defines the abstract code routine is decompressed. At this point, the linked abstract code data structure formed at step 610 is recreated.

At step 704, the execution control unit invokes an abstract code interpreter routine to process the abstract code data structure. At step 706, the interpreter routine executes the process defined in the abstract code by causing execution to jump to blocks of precompiled code responsive to the abstract code instructions. Once the abstract code procedure has been fully executed, control passes back to the procedure which called the abstract code procedure (step 708).

The Nth time the abstract code procedure is called and all for all subsequent times, control will pass from step 720 to step 710. At step 710, the execution control unit determines whether it is the Nth time the abstract code procedure has been called. Assuming it is the Nth time that the procedure is called, control will then pass to step 711.

At step 711, the compressed abstract code corresponding to the abstract code procedure is decompressed to create a linked abstract code data structure. This step 711 is only necessary if the abstract code data structure created at step 703 the first time the procedure was called has been disposed. At step 712, the execution control unit invokes a code generation routine. At step 714, the code generation routine generates machine code which implements the process defined in the abstract code procedure. Once the machine-code has been generated, the machine-code is executed at step 716. After the execution of the machine-code corresponding to the procedure has been completed, control passes back to the calling procedure (step 708).

When the abstract code procedure is called N+1 or more times, machine code for the procedure has already been generated. Therefore, once it has been determined that the procedure has been called more than N times (step 710), control passes directly to step 716, where the corresponding machine code is executed.

The process shown in FIG. 7 is only exemplary. The actual process of executing an abstract code procedure may vary from implementation to implementation. For example, the execution routine may simply be an interpreter or a code generator. Alternatively, the execution routine may be an execution control unit which causes less efficient machine-code to be generated the first time an abstract code procedure is called, and more efficient machine-code when the abstract code procedure is called more than a predetermined number of times. The execution control unit may also be configured to select an abstract code execution method based on information stored during previous sessions.

While specific embodiments of the present invention have been described, various modifications and substitutions will become apparent to one skilled in the art by this disclosure. Such modifications and substitutions are within the scope of the present invention, and are intended to be covered by the appended claims.

APPENDIX I
Note: Three asterisks are used to indicate where portions of code have been omitted for the purpose of brevity.

```
5    MCCodeUnit
       Types:
         MCCodeTypeArray:
           (0) Int: width=32, signed=T       [int]
           (1) Pointer: width=32, subtype=
10             Int: width=32, signed=T            [array[6]of int]
           (2) Void                          [void]
           (3) Proc: width=32
             argument types=
               MCCodeTypeArray: empty
15           return type=
               Void                          [proc() returns void]
           (4) Member: name=ANON, member_number=0, type=
             Int: width=32, signed=T              [9]

20                                    *   *   *

(10) Struct: members=
             MCMemberCodeTypeArray:
               4, 5, 6, 7, 8, 9           [[[aggregate(9,8,5...]
25         (11) Proc: width=32
             argument types=
               MCCodeTypeArray:
                 (0) Pointer: width=32, subtype=
                   Int: width=32, signed=T    [array[6]of int]
30               (1) Int: width=32, signed=T  [int]
             return type=
               Void                       [proc(v:in array o...]
           (12) Int: width=8, signed=F     [bool]

35                                    *   *   *

Global variable definitions:
         MCGlobalVarArray:
           (0) GlobalVar def outi, type=0    [outi:int;]
40         (1) GlobalVar def eol, type=0     [eol:int;]
           (2) GlobalVar def a, type=1       [a:array[6]of int=...]

Global init procedure: proc index = 0

45     Procedure definitions:
         MCProcArray:
```

82225.P615

-38-

```
(0) MCProc: .init
  Leaf proc=T, proc type=3, no return var
  Global references:
    MCGlobalRefArray:
      (0) GlobalRef a, type=1           [a:array[6]of int=...]

Arguments:
    MCArgVarArray: empty

Local variables:
    MCLocalVarArray: empty

Blocks:
    MCBlockArray: empty

Instructions:
    MCInstructionStream:
      (0) LoadSigned(6)                 [6]
      (1) Dup()                         [array[6]of int]
                        *   *   *
      (45) Exch()                       [array[6]of int]
      (46) Copy(0)
      (47) ProcReturn()                 [.init]

Offset of instructions at start of stmts:
    none
End of MCProc description for .init (1) MCProc: shellsort
  Leaf proc=T, proc type=11, no return var
  Global references:
    MCGlobalRefArray: empty Arguments:
    MCArgVarArray:
      (0) ArgVar: v, type=1, block=0, mode=in   [v:in array of int]
      (1) ArgVar: n, type=0, block=0, mode=in   [n:in int]

Local variables:
    MCLocalVarArray:
      (0) LocalVar: gap, type=0, block=1, aliased   [gap:int=n/2;]
      (1) LocalVar: i, type=0, block=2, aliased     [i:int=gap;]
      (2) LocalVar: j, type=0, block=3, aliased     [j:int=i-gap;]
      (3) LocalVar: temp, type=0, block=4           [temp:int=v[j];]
```

82225.P615

-39-

```
Blocks:
  MCBlockArray:
    (0) Block: level=1, outermost, range=[0,98]
      Block variables:
        (0) ArgVar: v, type=1, block=0, mode=in  [v:in array of int]
        (0) ArgVar: n, type=0, block=0, mode=in  [n:in int]
      Nested blocks={1}
```

\*   \*   \*

Instructions:

\*   \*   \*

End of MCProc description for shellsort (2) MCProc: main

\*   \*   \*

End of MCProc description for main

-40-

APPENDIX II

```
! MCCodeUnit: shell_sort

*   *   *

!*********************************************************************
! cpp definitions used by compressed files produced by the Linkable MCode
! generator. These definitions are common to all Linkable MCode files.
! Currently, the assembler is used to generate the Linkable MCode files,
! and the MCode is compressed by encoding each item of MCode information
! in one byte or a small number of bytes.
!*********************************************************************

*   *   *

!*********************************************************************
! End of the cpp definitions used for the compressed (asm) files
! produced by the Linkable MCode generator.
!*********************************************************************

!*********************************************************************
! Start of the compressed (assembler) encoding for one Linkable MCode file.
!*********************************************************************

.file   "shell_sort.s"
        .section ".rodata",#alloc
        .align  4
! Header for MCode object file
        .local  mcode_obj_header
        .local  string_table_origin
        .type   mcode_obj_header,#object
        .type   string_table_origin,#object mcode_obj_header:
        .word   MCODE_OBJECT_VERSION
        .word   linker_global_var_defs_origin
        .word   linker_global_var_defs_offsets
        .word   array_of_addrs_of_proc_ref_arrays
        .word   proc_trampolines
        .word   mcode_pickle_header
        .word   string_table_origin
! End of header for MCode object file ! Define the origin of the string table
```

```
              .pushsection ".data1"
              .align   4
      string_table_origin:
              .popsection
      !----------------------------------------------------------
      ! Global variable definitions
      !----------------------------------------------------------
              .section ".data",#alloc,#write
              .local   linker_global_var_defs_origin
              .local   linker_global_var_defs_offsets
              .type    linker_global_var_defs_origin,#object
              .type    linker_global_var_defs_offsets,#object linker_global_var_defs_origin:
              ARRAY_START(3) ! array of global vars defined in code unit
      .global_var_def_0:
              ! GlobalVar def outi, type=0
              .align   4
              .global  outi
      outi:
              .word    0
              .type    outi,#object
              .size    outi,4

.global_var_def_1:
              ! GlobalVar def eol, type=0
              .align   4
              .global  eol
      eol:
              .word    0
              .type    eol,#object
              .size    eol,4

.global_var_def_2:
              ! GlobalVar def a, type=1
              .align   4
              .global  a
      a:
              .word    0
              .type    a,#object
              .size    a,4

ARRAY_END ! of global var definition array linker_global_var_defs_offsets:
```

-42-

```
        ARRAY_START(3)
            .word   .global_var_def_0 - .global_var_def_0
            .word   .global_var_def_1 - .global_var_def_0
            .word   .global_var_def_2 - .global_var_def_0
5       ARRAY_END
! End of global variable definitions !-------------------------------------------------
    ! Global variable references
10  !-------------------------------------------------
            .section ".rodata",#alloc
    ! Array of pointers to arrays of global ref addrs for each proc
            .align  4
            .local  array_of_addrs_of_proc_ref_arrays
15          .type   array_of_addrs_of_proc_ref_arrays,#object array_of_addrs_of_proc_ref_arrays:
            ARRAY_START(3)
            .word   .init_for_shell_sort_ref_addrs
20          .word   0       ! shellsort has no global refs
            .word   .main_ref_addrs
            ARRAY_END
    ! End of array of pointers to arrays of global ref addrs for each proc 25  ! The proc ref arrays: arrays of global ref addrs for each proc
            .align  4
    .init_for_shell_sort_ref_addrs:
            ARRAY_START(1)
            .word   a
30          ARRAY_END .align  4
    .main_ref_addrs:
            ARRAY_START(4)
35          .word   eol
            .word   a
            .word   outi
            .word   shellsort
            ARRAY_END
40  ! End of arrays of global ref addrs for each proc !-------------------------------------------------
    ! Trampolines for procedures
    !-------------------------------------------------
45          .global internalize_mcode_proc
            .type   internalize_mcode_proc,#function
```

-43-

```
         .global  interpret_proc
         .type    interpret_proc,#function

.local   proc_trampolines
         .type    proc_trampolines,#object proc_trampolines:
         ARRAY_START(3)

! Proc init_for_shell_sort
         .section ".text",#alloc,#execinstr
         .align   8
         .skip    16
         .global  init_for_shell_sort
         .type    init_for_shell_sort,#function
         .local   unpickle_init_for_shell_sort
         .local   interpret_init_for_shell_sort
init_for_shell_sort:
         sethi    %hi(internalized_init_for_shell_sort),%g2
         or       %g2,%lo(internalized_init_for_shell_sort),%g2 ! addr of int. proc to %g2
         ld       [%g2],%g2          ! internalized proc to %g2
         tst      %g2                ! already internalized?
         bne      interpret_init_for_shell_sort! if so, leave internalized proc in %g2
         nop
unpickle_init_for_shell_sort:
         save     %sp,-96,%sp        ! new frame to save args for interp. proc
         sethi    %hi(init_for_shell_sort_mcode),%o0
         or       %o0,%lo(init_for_shell_sort_mcode),%o0
         call     internalize_mcode_proc,1
         nop
         sethi    %hi(internalized_init_for_shell_sort),%g2
         or       %g2,%lo(internalized_init_for_shell_sort),%g2 ! addr of int. proc to %g2
         st       %o0,[%g2]          ! store result: addr of intern. proc
         restore  %o0,0,%g2          ! restore orig frame; %g2 := intern proc
interpret_init_for_shell_sort:       ! still in original calling frame
         mov      %o7,%g3            ! save original call pc in %g3
         call     interpret_proc,0   ! orig args in %i0-i5...
         nop                         ! %g2 has intern proc, %g3 has ret addr
         unimp                       ! interpret_proc never returns to us
         .align   8
         .size    init_for_shell_sort,(.-init_for_shell_sort)

.section ".data",#alloc,#write
```

-44-

```
            .align   4
            .local   internalized_init_for_shell_sort
    internalized_init_for_shell_sort:
            .word    0
            .type    internalized_init_for_shell_sort,#object
            .size    internalized_init_for_shell_sort,4
    ! End of proc init_for_shell_sort ! Proc shellsort
                                    *    *    *

! End of proc shellsort

! Proc main
                                    *    *    *

! End of proc main
            ARRAY_END
    ! End of trampolines for procedures !---------------------------------------------------
    ! .init section for initializing the code unit "shell_sort"
    !---------------------------------------------------
            .section ".init",#alloc,#execinstr
            call     init_for_shell_sort
            nop !---------------------------------------------------
    ! Start of pickled MCode for code unit "shell_sort"
    !---------------------------------------------------
            .section ".rodata",#alloc
    ! Start of pickled MCode and pickle header
                                    *    *    *

! End of pickle header

! The various mcode pickle segments:
            DEFINE_STRING(name_label, "shell_sort")

! Start of MCCodeTypeArray
    type_table_origin:
            ARRAY_START(17)
    .type_0:
```

82225.P615

-45-

```
            ! int
            ! bit_size=32, byte_size=4, byte_align=4
            INT_TYPE(32, SIGNED_TYPE, 4, 4)
 5    .type_1:
            ! array[6]of int
            ! bit_size=32, byte_size=4, byte_align=4, sub_ti=0
            POINTER_TYPE(32, 0, 4, 4)

10    .type_2:
            ! void
            VOID_TYPE

.type_3:
15          ! proc() returns void
            ! bit_size=32, byte_size=4, byte_align=4, ret_ti=2, num_args=0
            PROC_TYPE(32, 2, 4, 4)
            ARRAY_START(0)  ! argument type indexes
            ARRAY_END ! end of argument type indexes
20                          *    *    *

! Start of MCGlobalVarArray
      global_var_table_origin:
25          ARRAY_START(3)
      .global_var_0:
            ! Global var: outi:int;
            DEFINE_STRING(string_1, "outi")
            GLOBAL_VAR(string_1, 0, UNALIASED_VAR)
30
      .global_var_1:
            ! Global var: eol:int;
            DEFINE_STRING(string_2, "eol")
            GLOBAL_VAR(string_2, 0, UNALIASED_VAR)
35
      .global_var_2:
            ! Global var: a:array[6]of int={9,8,5,7,3,11};
            DEFINE_STRING(string_3, "a")
            GLOBAL_VAR(string_3, 1, UNALIASED_VAR)
40          ARRAY_END global_var_offset_array:
            ARRAY_START(3)
            .word   .global_var_0 - .global_var_0
45          .word   .global_var_1 - .global_var_0
            .word   .global_var_2 - .global_var_0
```

-46-

```
        ARRAY_END
        ! End of MCGlobalVarArray

! Proc MCode pickles
 5   proc_defs_origin:
        ARRAY_START(3) ! proc array
     .proc_def_0:
     ! MCode pickle for proc init_for_shell_sort
            .local   init_for_shell_sort_mcode
10          .local   init_for_shell_sort_name_label
            .type    init_for_shell_sort_mcode,#object
            .type    init_for_shell_sort_name_label,#object

*   *   *
15
     ! Instructions for proc init_for_shell_sort
     .init_for_shell_sort_instructions:
            ARRAY_START(48)
            INT_OP_INSTRUCTION(LoadSigned, 6)
20          NULL_OP_INSTRUCTION(Dup)

*   *   *

NULL_OP_INSTRUCTION(Exch)
25          INDEX_OP_INSTRUCTION(Copy, 0)
            INDEX_OP_INSTRUCTION(ProcReturn, 2)
            ARRAY_END ! Table of statement start instruction indexes for proc init_for_shell_sort
30   .init_for_shell_sort_stmt_start_table:
            ARRAY_START(0)
            ARRAY_END .size    init_for_shell_sort_mcode,(.-init_for_shell_sort_mcode)
35          PROC_MCODE_PICKLE_END
     ! End of pickled MCode for proc init_for_shell_sort .proc_def_1:
     ! MCode pickle for proc shellsort
40
                            *   *   *

! End of pickled MCode for proc shellsort

45   .proc_def_2:
     ! MCode pickle for proc main
```

82225.P615

-47-

\* \* \*

```
! End of pickled MCode for proc main
        ARRAY_END ! end of proc array proc_defs_offset_array:
        ARRAY_START(3)
        .word   .proc_def_0 - .proc_def_0
        .word   .proc_def_1 - .proc_def_0
        .word   .proc_def_2 - .proc_def_0
        ARRAY_END
! End of proc MCode pickles
! End of pickled MCode for shell_sort
! End of file shell_sort.s !*********************************************************************
! End of the compressed (assembler) encoding for one Linkable MCode file.

*********************************************************************
                        ***********
```

What is claimed is:

1. A method for generating a platform-standard object file, the method comprising the steps of:
   a) providing a machine-independent software module, wherein the machine-independent software module contains abstract code defining at least one procedure;
   b) analyzing said abstract code to determine whether any global variables are defined in said machine-independent software module;
   c) if any global variables are defined in said machine-independent software module, then
      c1) generating a list of definitions of said any global variables;
      c2) storing said list of definitions in said platform-standard object file;
   d) analyzing said abstract code to determine whether said at least one procedure references any external variables or external procedures;
   e) if said at least one procedure references any external variables or external procedures, then
      e1) generating a list of symbol references indicative of said any external variables or external procedures;
      e2) storing said list of symbol references in said platform-standard object file;
   f) generating a sequence of machine instructions for calling an execution routine when a client calls said at least one procedure;
   g) storing said sequence of machine instructions in said platform-standard object file; and
   h) storing said abstract code in said platform-standard object file.

2. The method of claim 1 further including a step of compressing said abstract code prior to said step of storing said abstract code in said platform-standard object file.

3. The method of claim 1 wherein said list of symbol references includes a symbol reference indicative of said execution routine.

4. The method of claim 1 wherein said execution routine is a routine for interpreting said abstract code of said at least one procedure.

5. The method of claim 1 wherein said execution routine is a routine for generating machine code responsive to said at least one procedure during execution of a program which includes said at least one procedure.

6. The method of claim 1 wherein said execution routine is a routine for causing a processor to execute previously-generated machine-specific instructions which implement said at least one procedure.

7. A method for executing a computer program on a platform, said computer program including a first procedure implemented in a first platform-standard object file which calls a second procedure defined in a software module, the method comprising the steps of:
   a) generating a second platform-standard object file based on said software module, said second platform-standard object file including machine-independent abstract code;
   b) statically linking said first platform-standard object file to said second platform-standard object file;
   c) dynamically linking said second platform-standard object file to an execution routine during execution of said program;
   d) invoking said execution routine when said first procedure calls said second procedure; and
   e) causing said execution routine to execute said second procedure responsive to said code in said second platform-standard object file.

8. The method of claim 7 wherein said step of generating said second platform-standard object file based on said software module includes the steps of:
   a1) analyzing said abstract code to determine whether any global variables are defined in said software module;
   a2) if any global variables are defined in said software module, then
      i) generating a list of definitions of said any global variables;
      ii) storing said list of definitions in said second platform-standard object file;
   a3) analyzing said abstract code to determine whether said second procedure references any external variables or external procedures;
   a4) if said second procedure references any external variables or external procedures, then
      i) generating a list of symbol references indicative of said any external variables or external procedures;
      ii) storing said list of symbol references in said second platform-standard object file;
   a5) generating a sequence of machine instructions for calling said execution routine when said first procedure calls said second procedure;
   a6) storing said sequence of machine instructions in said second platform-standard object file; and
   a7) storing said abstract code in said second platform-standard object file.

9. The method of claim 7 wherein said software module is a machine-independent software module.

10. The method of claim 9 wherein said execution routine is an interpreter.

11. The method of claim 9 wherein said execution routine is a code generator.

12. The method of claim 9 wherein said execution routine executes said code according to a plurality of execution techniques, said step of causing said execution routine to execute said second procedure responsive to said code including the steps of:
   selecting an execution technique of said plurality of execution techniques; and
   executing said abstract code according to said execution technique.

13. The method of claim 12 wherein said plurality of execution techniques includes a technique for interpreting said code and a technique for generating machine code responsive to said code.

14. The method of claim 12 wherein said plurality of execution techniques includes a first technique generating machine code responsive to said code and a second technique for generating machine code responsive to said code, said first technique generating code relatively faster than said second technique, said second technique generating more efficient code relative to said first technique.

15. The method of claim 12 wherein said step of selecting an execution technique of said plurality of execution techniques is performed responsive to a frequency with which said second procedure is called.

16. An apparatus for generating a platform-standard object file from a machine-independent software module stored on a storage unit, wherein the machine-independent software module contains abstract code defining at least one procedure, the apparatus comprising:
   a global variable processing unit for analyzing said abstract code to determine whether any global variables are defined in said machine-independent software module, if any global variables are defined in said machine-independent software module, then said global variable processing unit generating a list of definitions of said any global variables and storing said list of definitions in said platform-standard object file;

an external reference processing unit for analyzing said abstract code to determine whether said at least one procedure references any external variables or external procedures, if said at least one procedure references any external variables or external procedures, then said external reference processing unit generating a list of symbol references indicative of said any external variables or external procedures and storing said list of symbol references in said platform-standard object file;

a call routine generation unit for generating a sequence of machine instructions for calling an execution routine when a client calls said at least one procedure and storing said sequence of machine instructions in said platform-standard object file; and an abstract code encapsulating unit for storing said abstract code in said platform-standard object file.

17. The apparatus of claim 16 wherein said list of symbol references includes a symbol reference indicative of said execution routine.

18. The apparatus of claim 16 wherein said execution routine is a routine for interpreting said abstract code of said at least one procedure.

19. The apparatus of claim 16 wherein said execution routine is a routine for generating machine code responsive to said at least one procedure during execution of a program which includes said at least one procedure.

20. The apparatus of claim 16 wherein said execution routine is a routine for causing a processor to execute previously-generated machine-specific instructions which implement said at least one procedure.

21. The apparatus of claim 16 further comprising:

a processor and a memory coupled to said processor, wherein each of said global variable processing unit, said external reference processing unit, said call routine generation unit and said abstract code encapsulating unit is implemented by causing said processor to execute a plurality of instructions stored in said memory.

* * * * *

UNITED STATES PATENT AND TRADEMARK OFFICE
CERTIFICATE OF CORRECTION

PATENT NO. : 5,590,331
DATED : December 31, 1996
INVENTOR(S) : Lewis et al.

It is certified that error appears in the above-identified patent and that said Letters Patent is hereby corrected as shown below:

Title page, item [57]

In the abstract, at line 3, please delete "convened" and insert --converted--.

Signed and Sealed this

Fourteenth Day of March, 2000

Attest:

Attesting Officer

Q. TODD DICKINSON

Commissioner of Patents and Trademarks